United States Patent [19]

Cheresnowsky et al.

[11] Patent Number: 4,604,266
[45] Date of Patent: Aug. 5, 1986

[54] PROCESS FOR PURIFYING MOLYBDENUM TRIOXIDE

[75] Inventors: Michael J. Cheresnowsky; Timothy A. Brunelli, both of Towanda; Robin W. Munn, Sayre; Tai K. Kim, Towanda, all of Pa.

[73] Assignee: GTE Products Corporation, Stamford, Conn.

[21] Appl. No.: 716,727

[22] Filed: Mar. 27, 1985

Related U.S. Application Data

[63] Continuation of Ser. No. 584,843, Feb. 24, 1984, Pat. No. 4,525,331.

[51] Int. Cl.$^4$ .............................................. C01G 39/00
[52] U.S. Cl. ........................................ 423/54; 423/56; 423/58; 423/61; 423/606
[58] Field of Search ...................... 423/53, 54, 56, 58, 423/606

[56] References Cited

U.S. PATENT DOCUMENTS

| | | | |
|---|---|---|---|
| 3,694,147 | 9/1972 | Drobnick et al. | 423/53 |
| 3,829,550 | 8/1974 | Ronzio et al. | 423/56 |
| 3,848,049 | 11/1974 | Ronzio et al. | 423/56 |
| 3,860,419 | 1/1975 | Weber et al. | 423/53 |
| 3,957,946 | 5/1976 | Ronzio | 423/54 |

Primary Examiner—H. T. Carter
Attorney, Agent, or Firm—Robert E. Walter

[57] ABSTRACT

Processes are described for preparing pure ammonium molybdate from impure roasted molybdenum concentrates. An aqueous solution of nitric acid and ammonium nitrate is contacted with impure molybdenum concentrate to solubilize a major portion of the impurities. The resulting molybdenum concentrate is digested in ammonium hydroxide under conditions that maximize iron precipitation and removal. The resulting ammonium molybdate solution is separated from the sludge and further purified by chelating cation exchange resin in the ammonium form.

1 Claim, 2 Drawing Figures

PROCESS FOR PURIFYING MOLYBDENUM TRIOXIDE

This application is a continuation of application Ser. No. 06/584,843, filed 2/24/84 now U.S. Pat. No. 4,525,331.

The present invention relates to a process for preparing ammonium molybdate of high purity from a source of molybdenum trioxide containing impurities.

BACKGROUND OF THE INVENTION

U.S. Pat. No. 3,860,419 to Weber, et al relates to a process for recovering molybdenum from molybdenum concentrates by digesting the concentrate in an aqueous nitric acid solution containing ammonium nitrate, separating the solid phase from the liquid phase, and treating the solid phase with ammonium hydroxide to produce ammonium molybdate. In column 3, lines 9–16, the digesting solution is disclosed as containing substantially 1.0 to 4.0 moles per liter of free nitric acid and 0.5 to 2.0 moles per liter of ammonium nitrate. The weight ratio of solution to concentrate is substantially 1:1 to 3:1. In column 3, lines 17–26, the preferred range of the solution is described as containing from about 2.0–2.3 moles per liter nitric acid and 1.5 to 2 moles per liter of ammonium nitrate.

Acid-leach processes such as U.S. Pat. No. 3,860,419 to Weber et al and U.S. Pat. No. 3,694,147 to Drobnick et al leave some calcium, magnesium and other impurities in the roasted molybdenum concentrate. Impurities also remain from water-leach processes such as described in U.S. Pat. No. 3,957,946 to Ronzio et al. The impurities contaminate the ammonium molybdate solution and the crystalline ammonium molybdate product. In U.S. Pat. No. 3,957,946 chelating cation resin in hydrogen form is used to remove residual contaminating ions from the ammonium molybdate solution (column 6, lines 2–14).

SUMMARY OF THE INVENTION

The process of the present invention is effective in removing substantially all of the impurities from an impure technical grade of roasted molybdenum concentrate. The present invention produces ammonium molybdate having an extremely low impurity level since impurities are removed according to a multistep process.

In accordance with the present invention, there is provided a method for preparing ammonium molybdate having low impurity level from an impure molybdenum oxide concentrate. First, the molybdenum oxide concentrate is contacted with an aqueous solution comprising nitric acid and ammonium nitrate at a suitable concentration to solubilize a major portion of the impurities. This step is illustrated as LEACH in FIGS. 1 and 2. In accordance with the preferred embodiments, applicants' process may utilize a lower ratio of aqueous leach solution per part of molybdenum oxide concentrate than one would expect from U.S. Pat. No. 3,860,419 mentioned above. According to the same preferred embodiment, the molybdenum oxide concentrate is treated with from about 0.85 parts to about 1 part by weight aqueous solution of nitric acid and ammonium nitrate to remove a major portion of the impurities. Applicants believe that by using less leach solution per part of molybdenum oxide concentrate than would be expected according to U.S. Pat. No. 3,860,419, more molybdenum values are retained in the concentrate so that an improved efficiency of the process can be achieved.

In accordance with the preferred embodiments, applicants' process may utilize a higher nitric acid concentration than one would expect from U.S. Pat. No. 3,860,419. Applicants believe that higher nitric acid concentration provides better purification by solubilizing more impurities and by improving oxidation of Fe(II) to Fe(III). A further benefit of the higher nitric acid concentration is improved oxidation of residue Mo(IV) to Mo(VI).

The next step is washing resulting molybdenum oxide concentrate followed by digesting the resulting molybdenum oxide concentrate with an aqueous solution of ammonium hydroxide at suitable concentrations to solubilize substantially all of the molybdenum values present and to render virtually all of the iron values insoluble so that they may be separated from the resulting ammonium molybdate solution. This step is illustrated as DIGESTION in FIGS. 1 and 2. According to a preferred embodiment of the present invention, certain conditions are employed to optimize iron precipitation in the ammonium molybdate solution. According to another preferred embodiment, precipitated iron is separated from the ammonium molybdate solution after the ammonium hydroxide digestion and prior to subsequent purification steps.

In the preferred operation of the invention, the ammonium molybdate solution is passed through iminodiacetate chelating cation exchange resin in the ammonium form to remove especially calcium and magnesium. Copper and certain other cations are also sorbed by the resin. This step is identified as CATION EXCHANGE in the various embodiments in FIGS. 1 and 2. Although the resin has very limited capacity for aluminum, it is used to advantage as long as possible. A preferred embodiment of the invention is use of the ammonium form of the chelating resin.

In an alternate mode of operation, part or virtually all of the copper is first removed from ammonium molybdate solution by adding ammonium sulfide. This step is identified as PRECIPITATION COPPER in FIGS. 1 and 2. After separating the insoluble residues, the ammonium molybdate solution then is passed through iminodiacetate chelating resin in ammonium form. Preferred embodiments of the alternate method include:

A. Addition of ammonium sulfide is made after precipitated iron has been separated from ammonium molybdate solution.

B. Addition of ammonium sulfide is made in the absence of an oxidant, such as hydrogen peroxide.

C. The amount of added ammonium sulfide is such that a very low concentration of copper remains in ammonium molybdate solution. Addition of stoichiometric quantities of ammonium sulfide or of excess ammonium sulfide is avoided.

Ammonium molybdate solution is concentrated to make crystalline ammonium molybdate after the above ion exchange purification. While aluminum is adsorbed onto the resin, no further purification is needed. Once aluminum passes through the resin, however, an aluminum-removal step is necessary before crystallization. As a preferred embodiment of the invention, ammonia is removed and the pH of the ammonium molybdate solution is adjusted from about 6 to about 8 to convert substantially all of the soluble aluminum values to an insoluble aluminum hydroxide. This step is identified as PRECIPITATION ALUMINUM in FIGS. 1 and 2. The insoluble residue containing aluminum values is separated and the resulting ammonium molybdate solution is concentrated to form ammonium molybdate having low impurities, especially aluminum, calcium, copper, magnesium, and iron. The crystallization step is identified as CRYSTALLIZATION in the drawings.

Because at least two additional separate steps are directed to the removal of specific impurities, applicants believe that the present process achieves a high purity product while minimizing loss of molybdenum values.

DRAWINGS

In the drawings, FIG. 1 is a flow chart illustrating preferred process steps; and FIG. 2 is a flow sheet of a detailed preferred embodiment.

DETAILED DESCRIPTION

Figure 1:
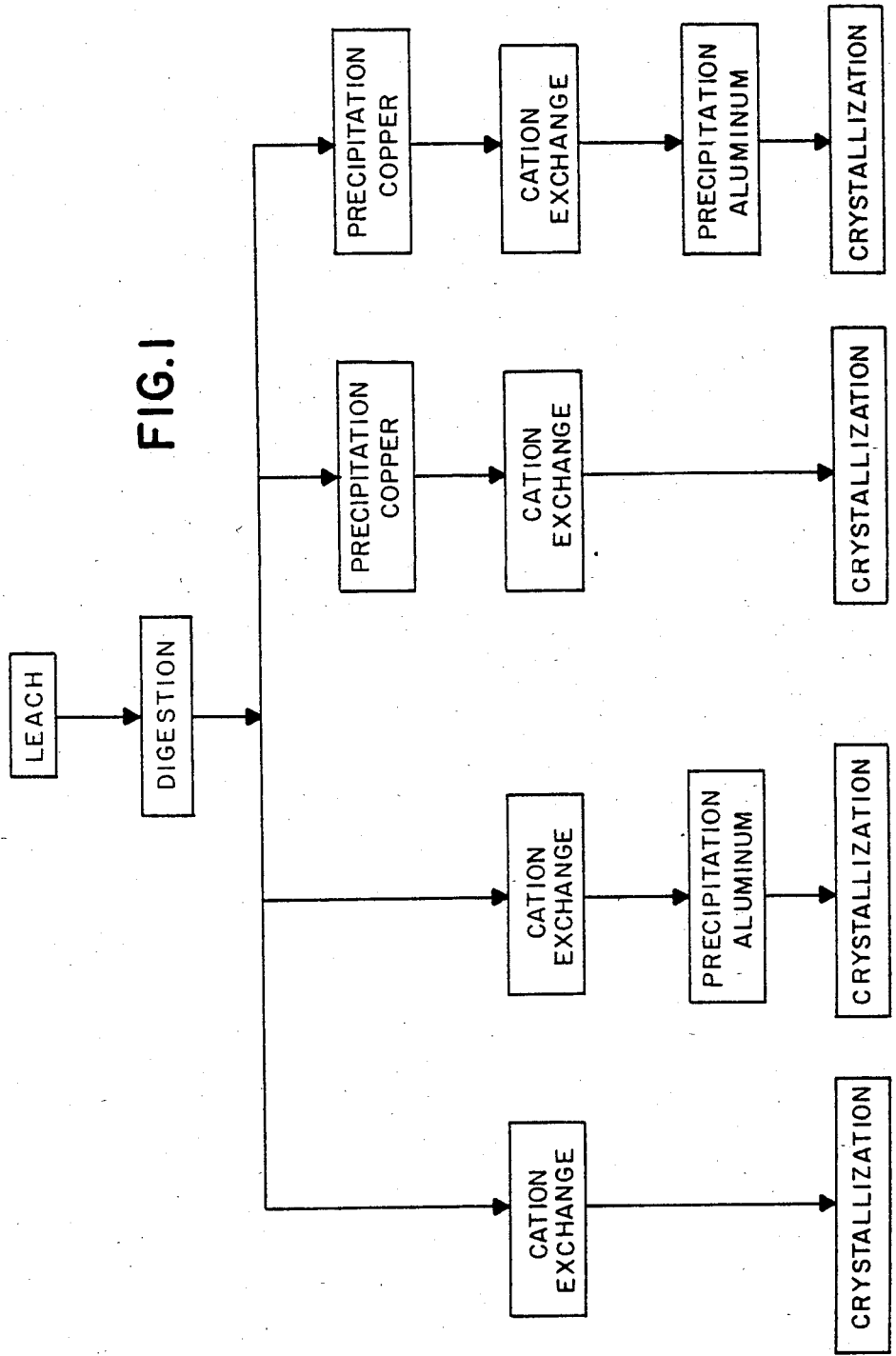
Figure 2:
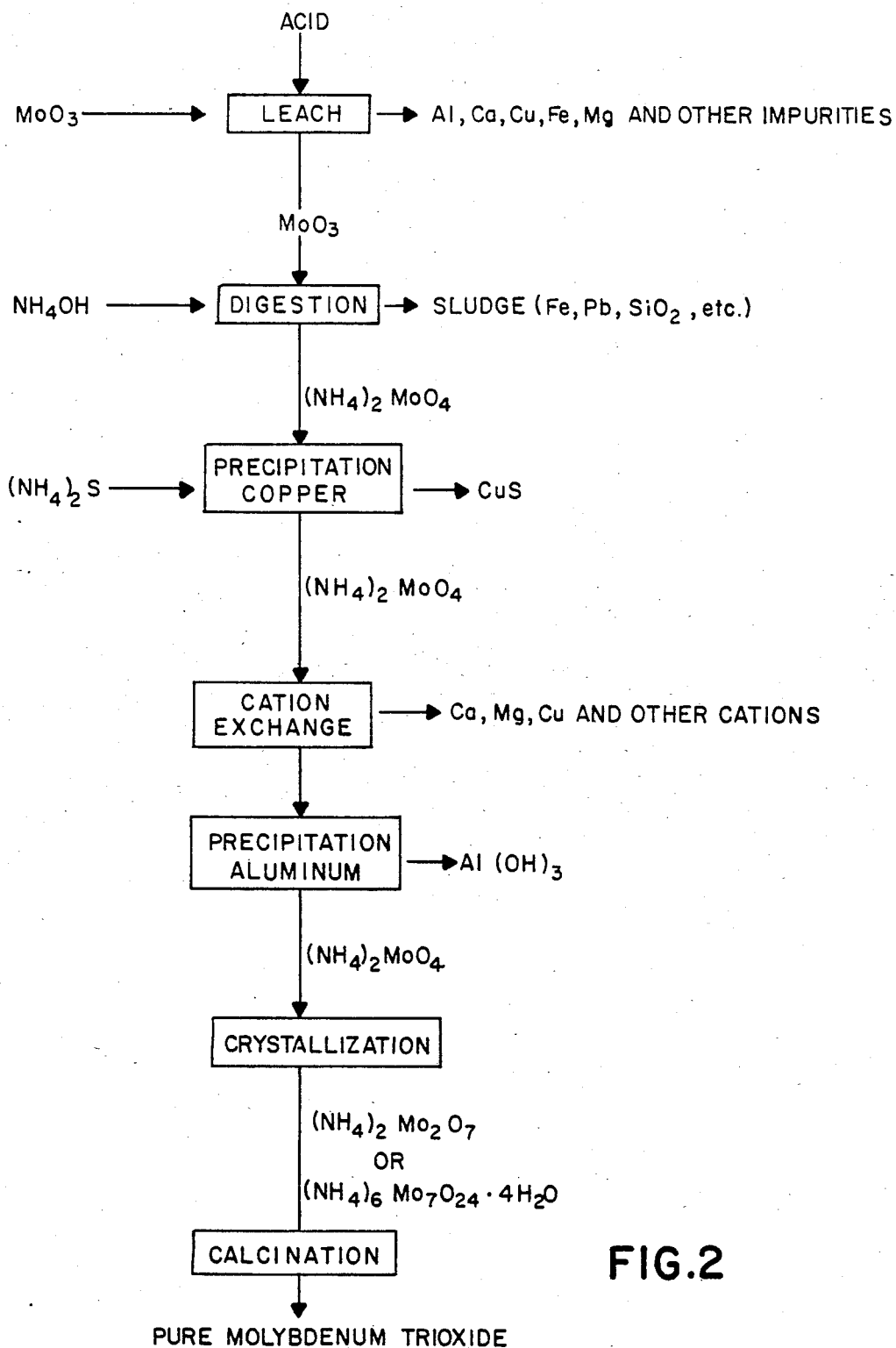

The impure concentrate of molybdenum trioxide used as the starting source is typically a technical grade of molybdenum oxide. Typically, such molybdenum oxide concentrates are produced by roasting molybdenite concentrates at elevated temperatures in the presence of excess air to convert the predominant portion of the molybdenum sulfide to molybdenum trioxide. The starting source typically contains about 7 to 15 percent by weight impurities. According to the preferred process of the present invention, it is desirable to make a very pure ammonium molybdate product. Preferably the ammonium molybdate product is about 99.95 percent pure with impurities of copper, iron, aluminum, tin, calcium, magnesium, manganese, nickel, and lead each being present in an amount less than about 10 parts per million.

The molybdenum containing concentrate is contacted with an aqueous solution comprising nitric acid and ammonium nitrate at suitable concentrations to solubilize a portion of the impurities. Although molybdenum trioxide is substantially insoluble in the above solution which solubilizes the impurities, it is preferred to use from about 0.85 parts to less than about one part by weight aqueous solution per part of impure molybdenum concentrate. It is theorized that using less leach solution per part of concentrate results in less loss of the molybdenum values being leached from the concentrate. Preferably, the aqueous solution comprises about 4.2 moles per liter of nitric acid and 1.75 moles per liter of ammonium nitrate. Preferably the process is carried out under suitable conditions so as to solubilize less than about 0.35 percent molybdenum values from the concentrate and solubilize at least a major portion of the impurities present in the concentrate. Typical contacting temperatures are from about 50° C. to 100° C. for periods of time of about two hours.

It is next desirable to separate the solid molybdenum concentrate from the solution containing the impurities. Preferably, the molybdenum concentrate is washed with water at a temperature of about 20° to about 80° C. for about ten to thirty minutes. Typically, the molybdenum concentrate may be separated from the wash solution by filtration, decantation, or any conventional liquid-solid separation.

Next, the molybdenum trioxide concentrate is digested with an aqueous solution of ammonium hydroxide at suitable concentrations to solubilize substantially all of the molybdenum values present in the molybdenum concentrate as ammonium molybdate. The ammoniacal leaching of the separated molybdenum concentrate is performed by employing solution containing from about 10 to about 25 percent by weight ammonium hydroxide. Preferably, the solid content of the slurry is controlled within the range of from about 10 percent up to about 40 percent by weight. The slurry is digested to extract and solubilize substantially all of the molybdenum trioxide constituent in the separated molybdenum concentrate. The preferred conditions are described:

1. A sufficient amount of hydrogen peroxide or other suitable oxidant is added to the room temperature slurry of ammonium hydroxide and molybdenum oxide. Digestion occurs for about 30 minutes.

2. The slurry is heated to 50° C.–60° C. and digested for about two hours. Most preferably the pH of the solution is maintained at a pH greater than about 9.5.

In an alternate method the oxidant could be added during the heated digestion, but more hydrogen peroxide is required as it decomposes on heating. In fact, one purpose of the heated digestion is to destroy the peroxide in the event that ammonium sulfide is added.

3. The digestion slurry is cooled to around room temperature.

4. The precipitated iron and the residual molybdenum concentrate which contains ammoniacal insoluble constituents such as silica are separated to give an ammonium molybdate solution containing residual impurities such as cations of copper, calcium, magnesium, aluminum and other. The ammonium molybdate solution is virtually iron-free.

Preferably, a sufficient amount of an oxidizing agent is added to the ammonium molybdate solution to oxidize soluble iron values from a plus two to a plus three state. Preferably the oxidizing agent is a material such as hydrogen peroxide which does not contribute additional impurities to the solution. After the addition of hydrogen peroxide the slurry is digested about 30 minutes without external heating. pH is then adjusted to >9.5 at room temperatures.

A purpose of the two hour digestion at 55° C. is to increase the size of iron precipitates and sludge particles so as to facilitate their separation from ammonium molybdate solution. The pH of the solution is adjusted to greater than about 9.5 by adding ammonium hydroxide if the pH is lower than this value. The pH adjustment is such that substantially all of the soluble iron values are converted to an insoluble ferric hydroxide which may be conveniently removed by conventional liquid-solid separation techniques. The slurry is cooled before liquid-solid separation to maximize iron precipitation by decreasing iron solubility. pH during liquid-solid separation is greater than about 9.5.

As preferred embodiments, precipitation of iron in ammonium molybdate solution is optimized by adding oxidant, by maintaining pH around 9.5 or higher, by digesting at around 55° C. for two hours, and by cooling to around room temperature before liquid-solid separation. As another preferred embodiment, the precipitated iron is separated from the ammonium molybdate solution before any further purification. As another preferred embodiment, pH during liquid-solid separation is greater than 9.5. These measures promote the precipitation of iron and other insolubles from the ammonium molybdate liquor as a separate and distinct step, and they improve iron removal.

In accordance with the principles of the present invention, it is next desirable to contact the ammonium molybdate solution with a chelating cation exchange resin to remove additional cation impurities and recover a very pure ammonium molybdate solution. Typical chelate resins that can be employed include:

N-(ar-vinylbenzyl) iminodiacetic acid, the polymers of N-(ar-vinylbenzyl) aspartic acid, the polymers of N-(a-methylar-vinylbenzyl)-iminodiacetic acid, N-(-methyl-ar-vinylbenzyl) aspartic acid, N-(ar-vinylbenzyl)-a, a-iminodiproprionic acid, and N-methyl-N-(ar-vinylbenzyl) aspartic acid. Preferred resins are Bayer Lewatit TP-207, Rohm and Haas IRC-718 and Bio-Rad Chelex 100. Generally residence times of from about 2 to 7 minutes are effective at temperatures of from about 20 to 50 degrees centigrade. The pH of the ammoniacal molybdate feed solution is from about 8.5 to about 10 and has a concentration of from about 150 to about 250 grams of molybdenum per liter.

The cation exchange resins are typically purchased in the sodium form. To condition the resin prior to use, the resin is contacted with a mineral acid such as sulfuric or hydrochloric acid to convert the resin to the hydrogen form. The acidified resin is washed and treated with ammonium hydroxide to convert it to the ammonium salt form for reception of the ammonium molybdate solution. In a similar manner, the resin loaded with cation impurities is regenerated by contacting the resin with a mineral acid to strip the cation impurities and the resin is conditioned by contacting with aqueous ammonium hydroxide solution. The conditioned resin is effective in sequestering calcium, magnesium, copper, manganese, nickel, aluminum, and other cations. The conditioning of the resin with ammonium hydroxide is preferable as compared with contacting the molybdate solution with the acid form since the acid form lowers the pH of the molybdate solution.

As an alternate operational mode of the invention, it is sometimes desirable to separate copper from the ammonium molybdate solution before ion-exchange treatment. Ammonium sulfide is added to the ammonium molybdate solution in an amount sufficient to convert substantially all of the soluble copper values present in the solution to an insoluble copper sulfide which in turn is separated from the solution as an insoluble residue. Preferably ammonium sulfide is added incrementally and the addition is stopped when a very small concentration of copper remains in solution. More preferably the amount used is just less than about the stoichiometric amount. The precipitated copper sulfide and other insolubles are removed.

It has been found that the addition of ammonium sulfide to an ammonium molybdate solution containing iron or to a slurry of ammonium molybdate and iron precipitate results in the formation of soluble iron compounds. Also, it has been found that the addition of ammonium sulfide to an ammonium molybdate solution containing iron and hydrogen peroxide or to a slurry of iron precipitate in ammonium molybdate solution containing hydrogen peroxide results in the formation of soluble iron compounds. Therefore, preferred embodiments include:

A. Maximized iron precipitation (as described earlier) with separation of iron precipitate from ammonium molybdate solution before ammonium sulfide addition.

B. Addition of ammonium sulfide to ammonium molybdate solution that is iron-free or virtually iron-free.

C. Addition of ammonium sulfide to ammonium molybdate solution that is free of hydrogen peroxide or other oxidant.

Small concentrations of copper are left in the ammonium molybdate solution to avoid excess sulfide, which is not desirable for a number of reasons: it has been found that excess sulfide causes a dirty gray precipitate to form as long as the sulfide is present. Because a particulate-free solution is needed for the ion-exchange column, the sulfide is destroyed by the addition of oxidant, some is converted to sulfur, which is removed by filtration, but some is converted to sulfate, which contaminates the product. These problems are avoided by using less than stoichiometric amounts of sulfide.

As a preferred embodiment of this alternate mode of operation, ammonium sulfide is added to nearly, but less than, stoichiometric amounts to avoid excess sulfide. Filtration of insoluble sulfides is facilitated by heating the ammonium molydbate/precipitate slurry for about 30 minutes at about 50° C. to aid particle growth and by then cooling to filter. After removing insoluble copper sulfide and other insolubles, the remaining ammonium molybdate solution is contacted with a chelating cation exchange resin to remove calcium, magnesium, the small remaining concentration of copper and additional cation impurities and to recover a very pure ammonium molybdate solution.

In accordance with the principles of the present invention, after aluminum has started to pass through the ion exchange resin, it is next desirable to remove ammonia from the ammonium molybdate solution and adjust pH to a range of from about 6 to about 8 to convert substantially all of the soluble aluminum values to an insoluble aluminum hydroxide. Ammonia can be removed by ion exchange, evaporation or other technique. The insoluble aluminum hydroxide values are separated prior to further processing the resulting solution.

Typically, spray drying or a crystallization process may be utilized to further concentrate the molybdate values to obtain a purified source of ammonium molybdate.

EXAMPLE

Leach solution was prepared at 4.2M $HNO_3$ and 1.75M $NH_4NO_3$. Technical grade molybdenum trioxide was slurried in the leach solution at a weight ration of 0.95 parts leach to 1 part solids. The slurries were heated to 75° C. to about 85° C. and maintained at the temperature for about 2 hours. The slurries were stirred vigorously during the contacting. The molybdenum oxide was then separated from the leach solution by filtration. The percent of molybdeum lost to the leach was 0.32%. The molybdic oxide was washed twice. Weight ratio of oxide to wash water was about 1:2. The washing involved slurrying the oxide in 70° C. water for ten minutes and filtering to separate the oxide from the wash.

For the ammonical leaching the resulting slurry had a solids content of about 25 percent by weight. About one gallon 50% hydrogen peroxide was added to about 2000 gallons of technical grade molybdenum trioxide/ammonium hydroxide slurry, and digestion without heating occurred for about 30 minutes. pH was then adjusted to about 9.9 by adding ammonium hydroxide. The slurry was then heated to 55° C. and digested for two hours. pH was adjusted to 9.9 after cooling to around 30° C., the insoluble sludge was separated from the resulting ammonium molybdate solution. The ammonium molybdate solution with pH 9.0 was contacted with Bayer Lewatit TP-207 resin in the ammonium form conditioned by contacting with a hydrochloric acid solution followed by an aqueous 7 percent ammonium hydroxide solution. Typical copper concentration is 0.001 grams per liter to 0.02 grams per liter since an amount less than the stoichiometric amount of sulfide was previously used for copper removal. The feed of this example included 0.01 grams calcium per liter and 0.15 grams magnesium per liter. A glass column six inches in diameter and eight feet high with the Lewatit TP-207 resin was used. Breakthrough occurred after 180 gallons of liquor was passed over one cubic foot of the resin. Residence time was five minutes and resin capacity at breakthrough was 10 grams calcium, 60 grams magnesium and 7 grams of copper all per cubic foot. Next, ammonia is removed from the solution until a pH of 7.2 is achieved. An aluminum hydroxide precipitate is separated. Crystalline ammonium molybdate was then produced. Calcium, iron, manganese, magnesium, nickel, aluminum, copper were all reduced to less than about 5 parts per million.

INDUSTRIAL APPLICABILITY

The present invention is useful for making a high purity ammonium molybdate from impure technical grade molybdenum trioxide.

We claim:

1. A method for preparing ammonium molybdate having low impurities, of iron from an impure concentrate of molybdenum trioxide consisting of contacting said concentrate with from about 0.85 to less than about one part by weight of an aqueous solution comprising about 4.2 moles per liter of nitric acid and 1.75 moles per liter ammonium nitrate at suitable concentrations to solubilize a major portion of said iron impurity and less than about 0.35 percent of of the molybdenum values from said concentrate, washing the resulting concentrate, for a period of about two hours digesting said resulting concentrate at a temperature of from about 50 to about 60 degrees centigrade with an aqueous solution of ammonium hydroxide at suitable concentrations to solubilize substantially all of the molybdenum values present in said resulting concentrate as ammonium molybdate and form an ammonium molybdate solution, adding an oxidizing agent to said ammonium molybdate solution to oxidize iron values from a plus two to a plus three oxidation state, adjusting pH of said solution to greater than about 9.5 by adding ammonium hydroxide, further digesting for about one to about three hours at around 50° C. to about 60° C. to form an iron precipitate, cooling to about room temperature before liquid-solid separation to decrease iron solubility, separating iron precipitate and sludge from ammonium molybdate solution while maintaining the pH of the molybdate solution above about 9.5, and contacting said resulting ammonium molybdate solution with a chelate iminodiacetate ion exchange resin in ammonium form and concentrating said resulting ammonium molybdate to form ammonium molybdate having low iron impurities.

* * * * *